(12) United States Patent
Wang

(10) Patent No.: US 10,675,978 B2
(45) Date of Patent: Jun. 9, 2020

(54) ELECTRIC VEHICLE, VEHICLE-MOUNTED CHARGER, AND METHOD FOR CONTROLLING THE SAME

(71) Applicant: BYD COMPANY LIMITED, Shenzhen (CN)

(72) Inventor: Xinghui Wang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 205 days.

(21) Appl. No.: 15/776,131

(22) PCT Filed: Dec. 16, 2016

(86) PCT No.: PCT/CN2016/110270
§ 371 (c)(1),
(2) Date: May 15, 2018

(87) PCT Pub. No.: WO2017/101837
PCT Pub. Date: Jun. 22, 2017

(65) Prior Publication Data
US 2018/0319285 A1 Nov. 8, 2018

(30) Foreign Application Priority Data

Dec. 18, 2015 (CN) .......................... 2015 1 0956676

(51) Int. Cl.
*H02J 7/00* (2006.01)
*B60L 53/22* (2019.01)
(Continued)

(52) U.S. Cl.
CPC ........... *B60L 11/1812* (2013.01); *B60L 3/003* (2013.01); *B60L 53/14* (2019.02); *B60L 53/22* (2019.02);
(Continued)

(58) Field of Classification Search
CPC ...... B60L 11/1812; B60L 3/003; B60L 58/12; B60L 53/00; B60L 58/24; B60L 53/22;
(Continued)

(56) References Cited

U.S. PATENT DOCUMENTS 5,287,051 A * 2/1994 Konrad ............. H02M 7/53875
318/803
5,486,748 A * 1/1996 Konrad ............. H02M 7/53875
318/811
(Continued)

FOREIGN PATENT DOCUMENTS

CN 101604923 A 12/2009
CN 101800472 A 8/2010
(Continued)

OTHER PUBLICATIONS

The World Intellectual Property Organization (WIPO) International Search Report and Written Opinion for PCT/CN2016/110270 dated Mar. 23, 2017 7 Pages.

*Primary Examiner* — Robert Grant
*Assistant Examiner* — John T Trischler
(74) *Attorney, Agent, or Firm* — Anova Law Group, PLLC

(57) ABSTRACT

The present disclosure provides an electric vehicle, a vehicle-mounted charger and a method for controlling the same. The method includes: obtaining a first total discharging period for controlling the H bridge in a first manner and a second total charging period for controlling the H bridge in a second manner when a power battery discharges via the vehicle-mounted charger; determining a relation between the first total discharging period and the second total discharging period; selecting a manner for controlling the H bridge according to a relation between the first total discharging period and the second total discharging period to perform temperature balanced control over the first switch
(Continued)

transistor, the second switch transistor, the third switch transistor and the fourth switch transistor.

14 Claims, 7 Drawing Sheets

(51) Int. Cl.
*B60L 11/18* (2006.01)
*B60L 3/00* (2019.01)
*B60L 53/30* (2019.01)
*B60L 53/14* (2019.01)
*B60L 58/24* (2019.01)

(52) U.S. Cl.
CPC ............ *B60L 53/30* (2019.02); *B60L 58/24* (2019.02); *H02J 7/0091* (2013.01); *H02J 7/007192* (2020.01); *H02J 7/007194* (2020.01); *B60L 2240/525* (2013.01); *Y02T 10/7005* (2013.01); *Y02T 10/7072* (2013.01); *Y02T 90/127* (2013.01); *Y02T 90/14* (2013.01)

(58) Field of Classification Search
CPC .... B60L 53/14; B60L 53/30; H02J 7/007192; H02J 7/007194; H02J 7/0091
USPC ......................................................... 320/109
See application file for complete search history.

(56) References Cited

U.S. PATENT DOCUMENTS

| | | | | |
|---|---|---|---|---|
| 5,686,812 A * | 11/1997 | Hotta | ................... | H02J 7/0031 320/134 |
| 6,919,693 B2 * | 7/2005 | Fushimi | ............ | H05B 41/2822 315/219 |
| 7,043,377 B2 * | 5/2006 | Shiraishi | ................ | H02M 7/48 702/57 |
| 7,176,658 B2 * | 2/2007 | Quazi | ................ | H02M 7/2176 322/24 |
| 8,222,862 B2 * | 7/2012 | Ichikawa | ............... | B60L 58/20 320/116 |
| 8,362,643 B2 * | 1/2013 | Luo | ......................... | H02J 3/32 307/46 |
| 8,423,218 B2 * | 4/2013 | Koide | ..................... | B60K 6/46 701/22 |
| 8,432,715 B2 * | 4/2013 | Fukuta | .................... | H02M 1/36 363/132 |
| 8,487,922 B2 * | 7/2013 | Brown | ................ | G09G 3/3688 307/108 |
| 8,610,400 B2 * | 12/2013 | Stevens | ............... | H04B 5/0037 320/108 |
| 8,751,085 B2 * | 6/2014 | Major | ..................... | G06F 17/00 701/22 |
| 8,786,227 B2 * | 7/2014 | Kubo | ................... | B60H 1/3213 310/16 |
| 8,810,060 B2 * | 8/2014 | Kamaga | .................. | B60L 50/61 307/9.1 |
| 8,862,414 B2 * | 10/2014 | LePort | ................. | H01M 10/486 340/438 |
| 8,884,562 B1 * | 11/2014 | Cameron, Jr. | ............ | H02P 6/10 318/400.29 |
| 9,056,207 B2 * | 6/2015 | Shao | .................... | A61N 1/3912 |
| 9,174,540 B2 * | 11/2015 | Kwak | .................. | B60H 1/00385 |
| 9,178,379 B2 * | 11/2015 | Choi | ................... | B60L 53/305 |
| 9,240,703 B2 * | 1/2016 | Jang | ......................... | H02J 7/04 |
| 9,263,960 B2 * | 2/2016 | Jovanovi | ............ | H02M 1/10 |
| 9,276,426 B2 * | 3/2016 | Kim | ..................... | H02J 7/0055 |
| 9,304,969 B2 * | 4/2016 | Doi | ........................ | G01R 31/367 |
| 9,428,173 B2 * | 8/2016 | Stefanon | ............... | B60W 10/26 |
| 9,455,641 B2 * | 9/2016 | Kondo | .................. | H02M 3/33584 |
| 9,484,836 B2 * | 11/2016 | Watanabe | ................. | H02M 7/483 |
| 9,583,956 B2 * | 2/2017 | Wang | ................... | B60L 53/65 |
| 9,623,761 B2 * | 4/2017 | Gale | ......................... | B60L 3/04 |
| 9,667,159 B2 * | 5/2017 | Akamatsu | ........... | H02M 7/4807 |
| 9,667,171 B2 * | 5/2017 | Hara | ................... | H02M 3/3376 |
| 9,742,289 B2 * | 8/2017 | Hayakawa | ......... | H02M 3/33507 |
| 9,806,634 B2 * | 10/2017 | Kano | ........................ | B60L 7/14 |
| 9,871,395 B2 * | 1/2018 | Yoshida | ................ | H02J 7/0029 |
| 9,998,111 B2 * | 6/2018 | Ngo | ...................... | H03K 17/122 |
| 10,086,711 B2 * | 10/2018 | Kawamura | ............. | B60L 53/22 |
| 10,224,826 B2 * | 3/2019 | Iyasu | ................ | H02M 3/33576 |
| 10,483,882 B2 * | 11/2019 | Ashida | .................. | B60L 3/0038 |
| 10,498,252 B2 * | 12/2019 | Wang | ................... | H02M 7/219 |
| 2001/0015904 A1 * | 8/2001 | Kimura | ................. | H02M 7/538 363/131 |
| 2002/0075698 A1 * | 6/2002 | Kuranuki | ................ | H02M 1/34 363/17 |
| 2004/0212319 A1 * | 10/2004 | Fushimi | ............ | H05B 41/2822 315/276 |
| 2005/0146308 A1 * | 7/2005 | Quazi | ................ | H02M 7/2176 322/28 |
| 2009/0039831 A1 * | 2/2009 | Ichikawa | ................ | B60L 58/20 320/118 |
| 2010/0134053 A1 * | 6/2010 | Yamada | ............ | H02M 7/53875 318/162 |
| 2010/0270860 A1 * | 10/2010 | Kamaga | .................... | B60L 1/14 307/10.7 |
| 2011/0074755 A1 * | 3/2011 | Brown | ................ | G09G 3/3688 345/211 |
| 2011/0080149 A1 * | 4/2011 | Fukuta | .................... | H02M 1/36 323/284 |
| 2011/0137503 A1 * | 6/2011 | Koide | ..................... | B60K 6/46 701/22 |
| 2011/0285214 A1 * | 11/2011 | Stevens | .................... | H02J 50/10 307/104 |
| 2012/0001575 A1 * | 1/2012 | Kubo | .................... | B60H 1/3213 318/400.17 |
| 2012/0161925 A1 * | 6/2012 | Gale | ........................ | B60L 53/65 340/5.28 |
| 2013/0057075 A1 * | 3/2013 | Kim | ........................... | H02J 7/00 307/72 |
| 2013/0073229 A1 * | 3/2013 | LePort | ................ | H01M 10/486 702/58 |
| 2013/0134941 A1 * | 5/2013 | Jang | ........................... | H02J 7/04 320/116 |
| 2013/0151087 A1 * | 6/2013 | Doi | ........................ | H02J 7/007 701/50 |
| 2014/0002022 A1 * | 1/2014 | Choi | ....................... | H02J 7/027 320/109 |
| 2014/0039735 A1 * | 2/2014 | Major | ..................... | G06F 17/00 701/22 |
| 2014/0062368 A1 * | 3/2014 | Roessler | ................. | B60L 3/003 318/454 |
| 2014/0177281 A1 * | 6/2014 | Lai | ....................... | H02M 3/3353 363/17 |
| 2014/0292261 A1 * | 10/2014 | Wang | ........................ | B60L 3/12 320/107 |
| 2015/0006017 A1 * | 1/2015 | Kwak | .................. | B60H 1/00385 701/29.2 |
| 2015/0015181 A1 * | 1/2015 | Kondo | .................. | H02M 3/33584 320/103 |
| 2015/0042166 A1 * | 2/2015 | Fujita | ..................... | H02M 11/00 307/63 |
| 2015/0120104 A1 * | 4/2015 | Stefanon | .................. | B60L 50/16 701/22 |
| 2015/0256105 A1 * | 9/2015 | Kano | ........................ | B60L 7/14 307/10.1 |
| 2015/0263646 A1 * | 9/2015 | Hara | ...................... | B60L 53/36 363/17 |
| 2016/0099560 A1 * | 4/2016 | Yamada | ................. | H02H 5/044 361/103 |
| 2016/0105119 A1 * | 4/2016 | Akamatsu | ......... | H02M 3/33546 363/21.04 |
| 2016/0303987 A1 * | 10/2016 | Kawamura | ............. | B60L 53/22 |
| 2016/0352107 A1 * | 12/2016 | Yoshida | .................. | H02J 7/007 |
| 2016/0380527 A1 * | 12/2016 | Hayakawa | ........ | H02M 3/33507 363/21.12 |
| 2017/0025867 A1 * | 1/2017 | Wang | ..................... | H02J 7/0019 |
| 2017/0179944 A1 * | 6/2017 | Ngo | ...................... | H03K 17/122 |

(56) References Cited

U.S. PATENT DOCUMENTS

| | | | |
|---|---|---|---|
| 2017/0264123 A1* | 9/2017 | Mulawski | H02J 7/0021 |
| 2018/0062542 A1* | 3/2018 | Sakakibara | H02M 7/53873 |
| 2018/0102715 A1* | 4/2018 | Takahashi | H02M 7/48 |
| 2018/0278069 A1* | 9/2018 | Zhang | H02J 7/00 |
| 2018/0361860 A1* | 12/2018 | Wang | B60L 53/14 |
| 2018/0370370 A1* | 12/2018 | Wang | B60L 3/003 |
| 2018/0370381 A1* | 12/2018 | Wang | H02M 7/5395 |
| 2018/0375366 A1* | 12/2018 | Wang | H02M 7/797 |
| 2018/0375439 A1* | 12/2018 | Wang | H02J 7/022 |
| 2019/0020216 A1* | 1/2019 | Wang | H02M 7/162 |
| 2019/0089275 A1* | 3/2019 | Ashida | B60L 50/50 |
| 2020/0021102 A1* | 1/2020 | Kim | H02H 1/0007 |

FOREIGN PATENT DOCUMENTS

| | | |
|---|---|---|
| CN | 203826977 U | 9/2014 |
| CN | 104600998 A | 5/2015 |
| CN | 104953876 A | 9/2015 |
| KR | 100184137 B1 | 5/1999 |

\* cited by examiner

ELECTRIC VEHICLE, VEHICLE-MOUNTED CHARGER, AND METHOD FOR CONTROLLING THE SAME

CROSS-REFERENCE TO RELATED APPLICATION

The present application is a national phase entry under 35 U.S.C. § 371 of International Application No. PCT/CN2016/110270, filed on Dec. 16, 2016, which is based on and claims priority to Chinese Patent Application Serial No. 201510956676.2 filed on Dec. 18, 2015, all content of all of which is hereby incorporated by reference in its entity.

FIELD

The present disclosure relates to the technical field of electric vehicles, in particular to a method for controlling a vehicle-mounted charger of an electric vehicle, a vehicle-mounted charger of an electric vehicle, and an electric vehicle.

BACKGROUND

Along with the commercialization progress of electric vehicles, a vehicle-mounted charger of the electric vehicles has become one of important components in the electric vehicles.

There are many methods for discharging outwards from the whole vehicle via the vehicle-mounted charger. A monophase H bridge off-grid conversion control method is mostly adopted in related arts, which includes a dual-polarity control method and a mono-polarity control method.

However, when the dual-polarity control method is adopted, 4 switch tubes in an H bridge are all in a high frequency ON/OFF state, resulting in higher switching loss and larger heat loss; when the mono-polarity control method is adopted, although the heat loss of the switch tubes that is generated when the dual-polarity control method is adopted can be solved to some extent, the four switch tubes in the H bridge are controlled according to a fixing manner during a charging process or a discharging process of the whole vehicle, some switch tubes in the H bridge need to be switched off with current, so that the overheat problem of the switch tubes switched off with current is not effectively solved.

Therefore, no matter the dual-polarity control method or the mono-polarity control method is adopted, the heating problem of the switch tubes in the H bridge cannot be effectively solved, and the service life of the switch tubes is affected.

SUMMARY

The present disclosure aims to solve at least one of the technical problems in the related art to some extent. For this purpose, a first objective of the present disclosure is to provide a method for controlling a vehicle-mounted charger of an electric vehicle, which is capable of enabling heating of a first switch tube, a second switch tube, a third switch tube and a fourth switch tube in an H bridge to be relatively balanced, and improving a service life of the switch tubes in the H bridge.

A second objective of the present disclosure is to provide a vehicle-mounted charger of an electric vehicle. A third objective of the present disclosure is to provide an electric vehicle.

For the above purpose, in one aspect of embodiments of the present disclosure, there is provided a method for controlling a vehicle-mounted charger of an electric vehicle. The vehicle-mounted charger includes an H bridge. The H bridge includes a first switch tube, a second switch tube, a third switch tube and a fourth switch tube. The method includes: obtaining a first total discharging period for controlling the H bridge in a first manner and a second total discharging period for controlling the H bridge in a second manner when a power battery discharges via the vehicle-mounted charger; determining a relation between the first total discharging period and the second total discharging period; and selecting a manner for controlling the H bridge according to the relation between the first total discharging period and the second total discharging period to perform temperature balanced control over the first switch tube, the second switch tube, the third switch tube and the fourth switch tube.

According to the method for controlling a vehicle-mounted charger of an electric vehicle in embodiments of the present disclosure, when the power battery discharges via the vehicle-mounted charger every time, the first total discharging period for controlling the H bridge in the first manner and the second total discharging period for controlling the H bridge in the second manner are obtained; and the manner for controlling the H bridge is selected according to the relation between the first total discharging period and the second total discharging period, so as to perform the temperature balanced control over the first switch tube, the second switch tube, the third switch tube and the fourth switch tube, such that the heating of each switch tube is relatively balanced, the service life of the switch tubes in the H bridge is prolonged, and thus the service period is prolonged.

For the above purpose, in another aspect of embodiments of the present disclosure, there is provided a vehicle-mounted charger of an electric vehicle, including: an H bridge, including a first switch tube, a second switch tube, a third switch tube and a fourth switch tube; and a controller, configured to obtain a first total discharging period for controlling the H bridge in a first manner, and a second total discharging period for controlling the H bridge in a second manner when the power battery discharges via the vehicle-mounted charger; to determine a relation between the first total discharging period and the second total discharging period; and to select a manner for controlling the H bridge according to a relation between the first total discharging period and the second total discharging period to perform temperature balanced control over the first switch tube, the second switch tube, the third switch tube and the fourth switch tube.

According to the vehicle-mounted charger of an electric vehicle in embodiments of the present disclosure, when the power battery discharges via the vehicle-mounted charger every time, the controller is configured to obtain the first total discharging period for controlling the H bridge in the first manner and the second total discharging period for controlling the H bridge in the second manner; and to select the manner for controlling the H bridge according to the relation between the first total discharging period and the second total discharging period, so as to perform the temperature balanced control over the first switch tube, the second switch tube, the third switch tube and the fourth switch tube, such that the heating of each switch tube is relatively balanced, the service life of the switch tubes in the H bridge is prolonged, and thus the service period is prolonged.

In addition, an embodiment of the present disclosure also provides an electric vehicle, including the vehicle-mounted charger of an electric vehicle.

According to the electric vehicle in embodiments of the present disclosure, when the power battery discharges via the vehicle-mounted charger, the temperature balanced control over the first switch tube, the second switch tube, the third switch tube and the fourth switch tube in the H bridge can be realized, such that the heating of each switch tube is balanced, the service life of the switch tubes in the H bridge is prolonged, and thus the service period of the vehicle-mounted charger is prolonged.

DETAILED DESCRIPTION

Figure 1:
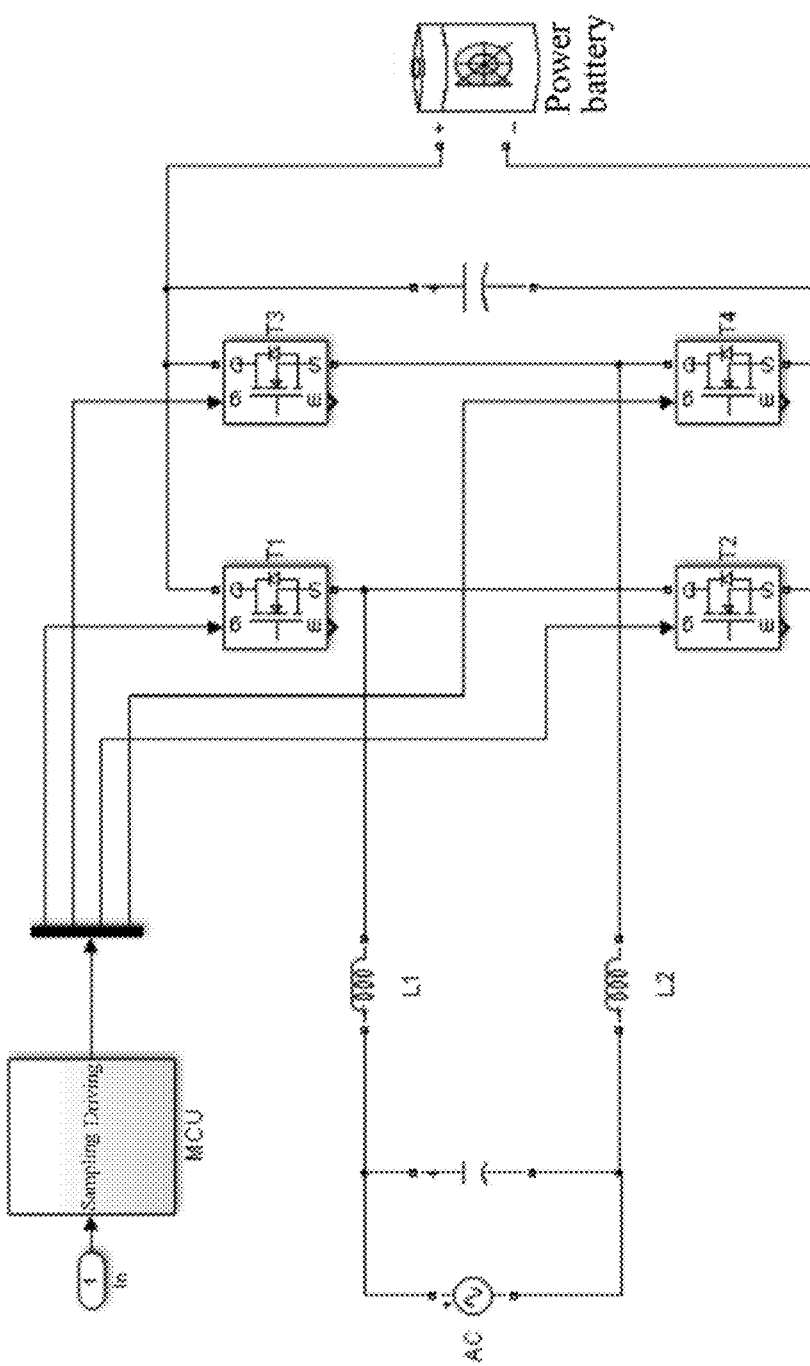
FIG. 1 is a circuit schematic diagram of a vehicle-mounted charger of an electric vehicle of an embodiment of the present disclosure.

The embodiments of the present disclosure are described in detail, examples of the embodiments are shown in the drawings, wherein, the same or similar numbers represent same or similar elements or elements having the same or similar functions from beginning to end. The embodiments described with reference to the drawings are exemplary, and aim to explain the present disclosure rather than understood as a limitation to the present disclosure.

The method for controlling a vehicle-mounted charger of an electric vehicle, a vehicle-mounted charger of an electric vehicle, and an electric vehicle with the vehicle-mounted charger, provided in embodiments of the present disclosure, are described with reference to the drawings as follows.

Figure 2:
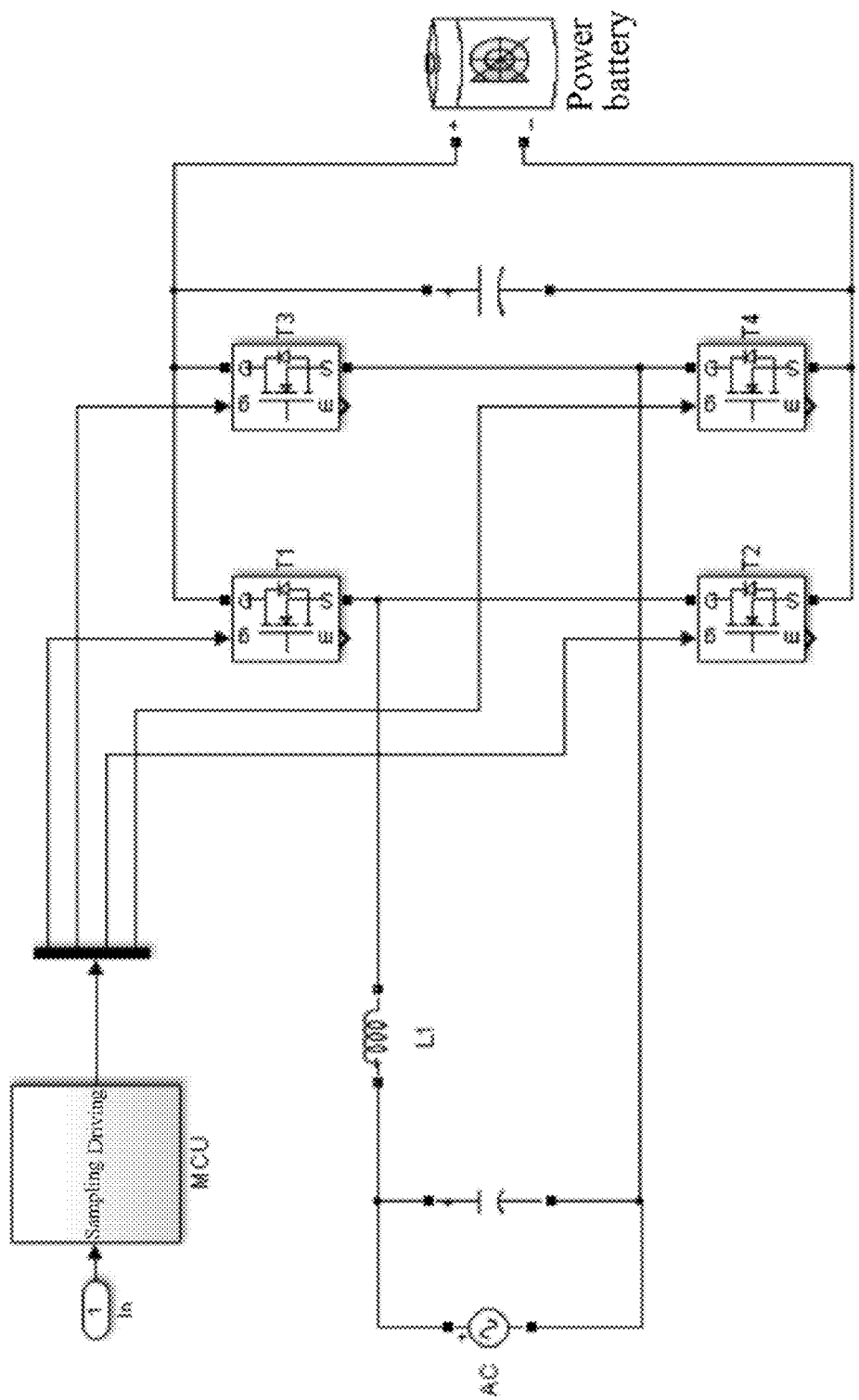
FIG. 2 is a circuit schematic diagram of a vehicle-mounted charger of an electric vehicle of another embodiment of the present disclosure.
Figure 3:
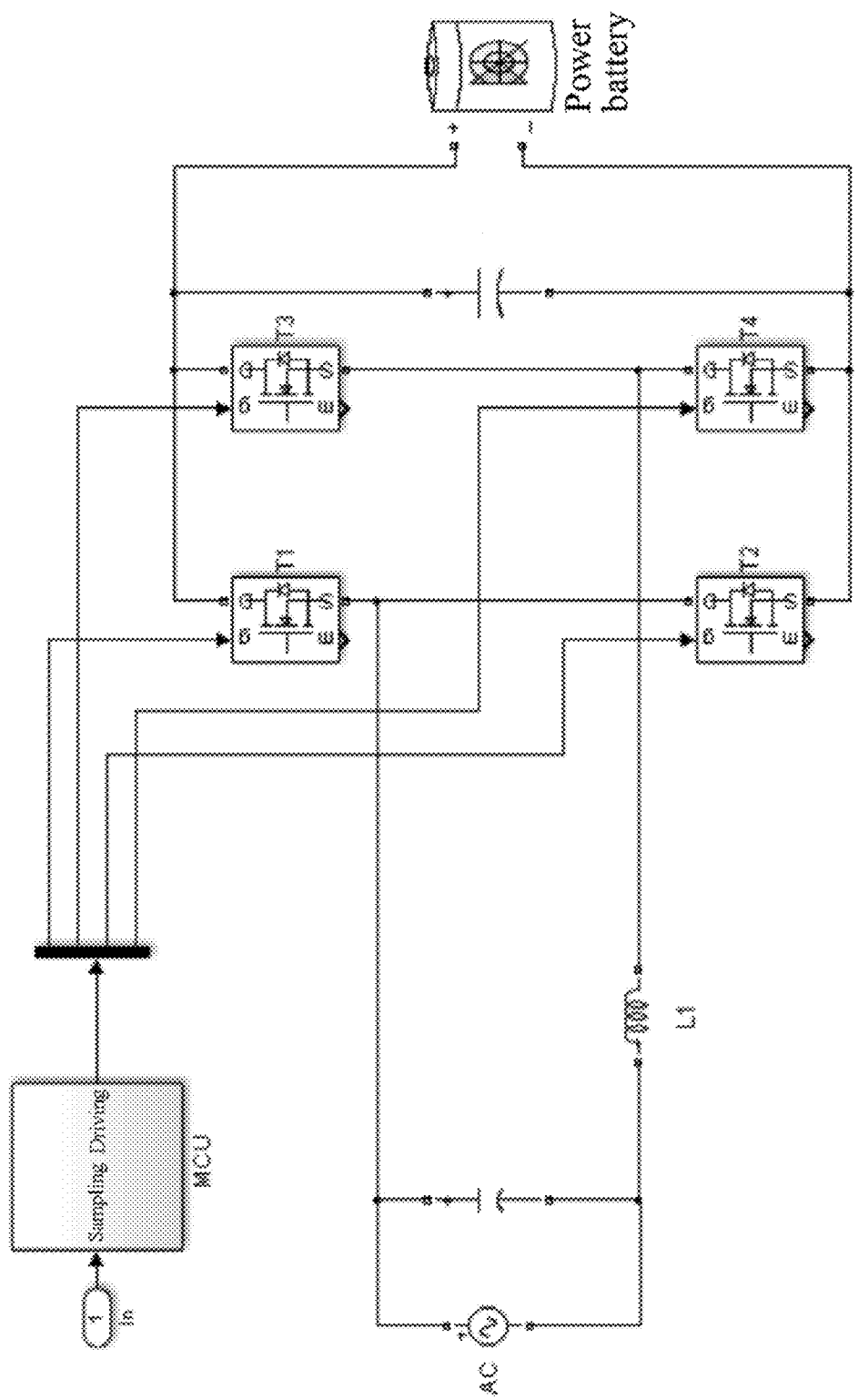
FIG. 3 is a circuit schematic diagram of a vehicle-mounted charger of an electric vehicle of still another embodiment of the present disclosure.

FIGS. 1 to 3 show a connecting manner of a vehicle-mounted charger of an electric vehicle according to an embodiment of the present disclosure. As shown in FIGS. 1 to 3, the vehicle-mounted charger of an electric vehicle according to embodiments of the present disclosure includes an H bridge. The H bridge includes a first switch tube T1, a second switch tube T2, a third switch tube T3 and a fourth switch tube T4. The vehicle-mounted charger of an electric vehicle as shown in FIG. 1 includes a first inductor L1 and a second inductor L2, in which a first end of the first inductor L1 is connected to one end of a load or an anode end of an alternating current power grid AC, and a first end of the second inductor L2 is connected to the other end of the load or a cathode end of the alternating current power grid AC, and a second end of the first inductor L1 and a second end of the second inductor L2 are connected to the H bridge. The vehicle-mounted charger of an electric vehicle as shown in FIG. 2 merely includes an inductor, for example, the inductor L1, in which a first end of the first inductor L1 is connected to one end of a load or an anode end of an alternating current power grid AC, and a second end of the first inductor L1 is connected to the H bridge. The vehicle-mounted charger of an electric vehicle as shown in FIG. 3 merely includes an inductor, for example, the first inductor L1, in which a first end of the first inductor L1 is connected to the other end of the load or a cathode end of the alternating current power grid AC, and a second end of the first inductor L1 is connected to the H bridge.

Figure 4:
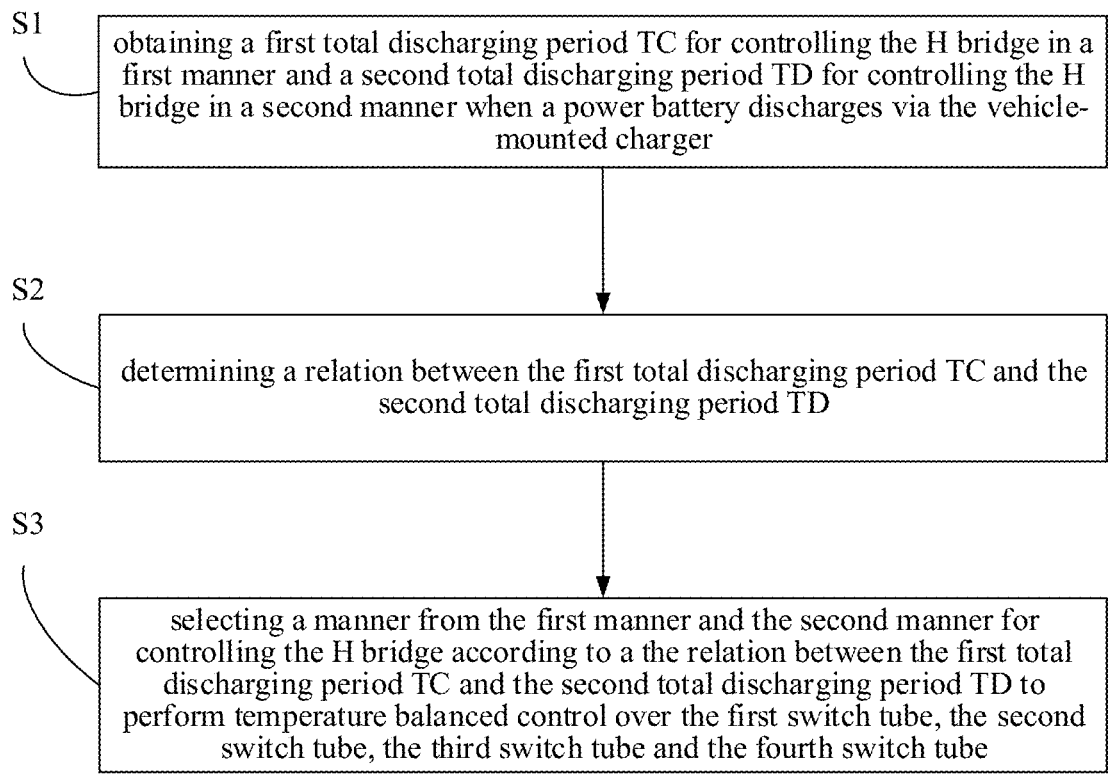
FIG. 4 is a flow chart of a method for controlling a vehicle-mounted charger of an electric vehicle of an embodiment of the present disclosure.

FIG. 4 is a flow chart of a method for controlling a vehicle-mounted charger of an electric vehicle according to an embodiment of the present disclosure. As shown in FIG. 4, the method for controlling a vehicle-mounted charger of an electric vehicle in an embodiment of the present disclosure includes followings.

At step S1, a first total discharging period TC for controlling the H bridge in a first manner and a second total discharging period TD for controlling the H bridge in a second manner are obtained, when the power battery starts to discharge via the vehicle-mounted charger.

Figure 5:
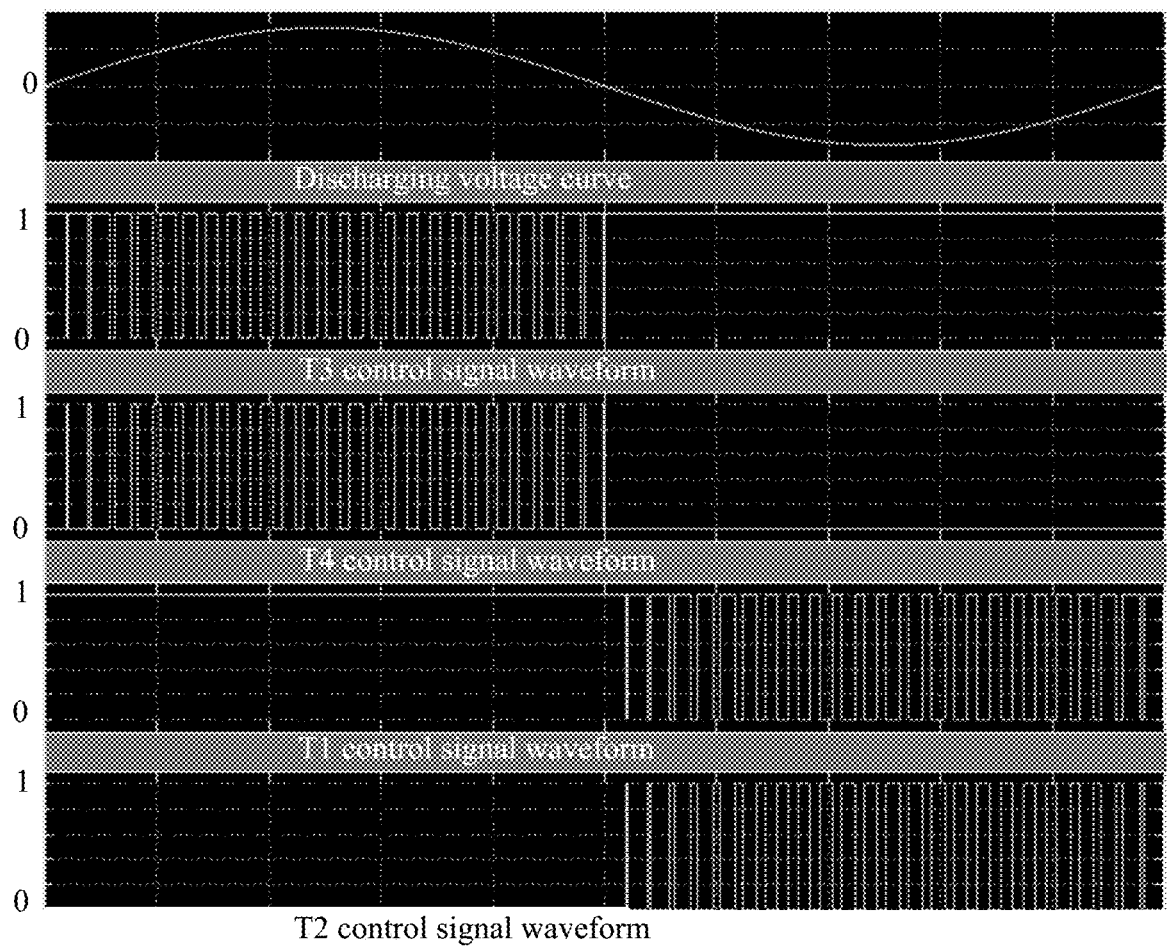
FIG. 5 is a schematic diagram of a control waveform of four switch tubes when an H bridge is controlled by adopting a first manner to enable a power battery to outwards discharge according to an embodiment of the present disclosure.

According to an embodiment of the present disclosure, as shown in FIG. 5, if the H bridge is controlled in the first manner A, and when an outward discharging transient voltage value of the vehicle-mounted charger is larger than 0, the first switch tube T1 is controlled to be ON, the second switch tube T2 is controlled to be OFF, and the third switch tube T3 and the fourth switch tube T4 are controlled to be ON and OFF complementarily and alternately. When the third switch tube T3 and the fourth switch tube T4 are controlled to be ON and OFF alternately and complementarily, the PWM waveform of the third switch tube T3 and the PWM waveform of the fourth switch tube T4 are controlled to be complementary with each other, and a duty ratio of the PWM waveform of the third switch tube T3 is controlled from large to small and then to large, and a duty ratio of the PWM waveform of the fourth switch tube T4 is controlled from small to large and then to small; when the outward discharging transient voltage value of the vehicle-mounted charger is smaller than 0, the third switch tube T3 is controlled to be ON, the fourth switch tube T4 is controlled to be OFF, and the first switch tube T1 and the second switch tube T2 are controlled to be ON and OFF complementarily and alternately. When the first switch tube T1 and the second switch tube T2 are controlled to be ON and OFF alternately and complementarily, the PWM waveform of the first switch tube T1 and the PWM waveform of the second switch tube T2 are controlled to be complementary with each other, and a duty ratio of the PWM waveform of the first switch tube T1 is controlled from large to small and then to large, and a duty ratio of the PWM waveform of the second switch tube T2 is controlled from small to large and then to small.

Figure 6:
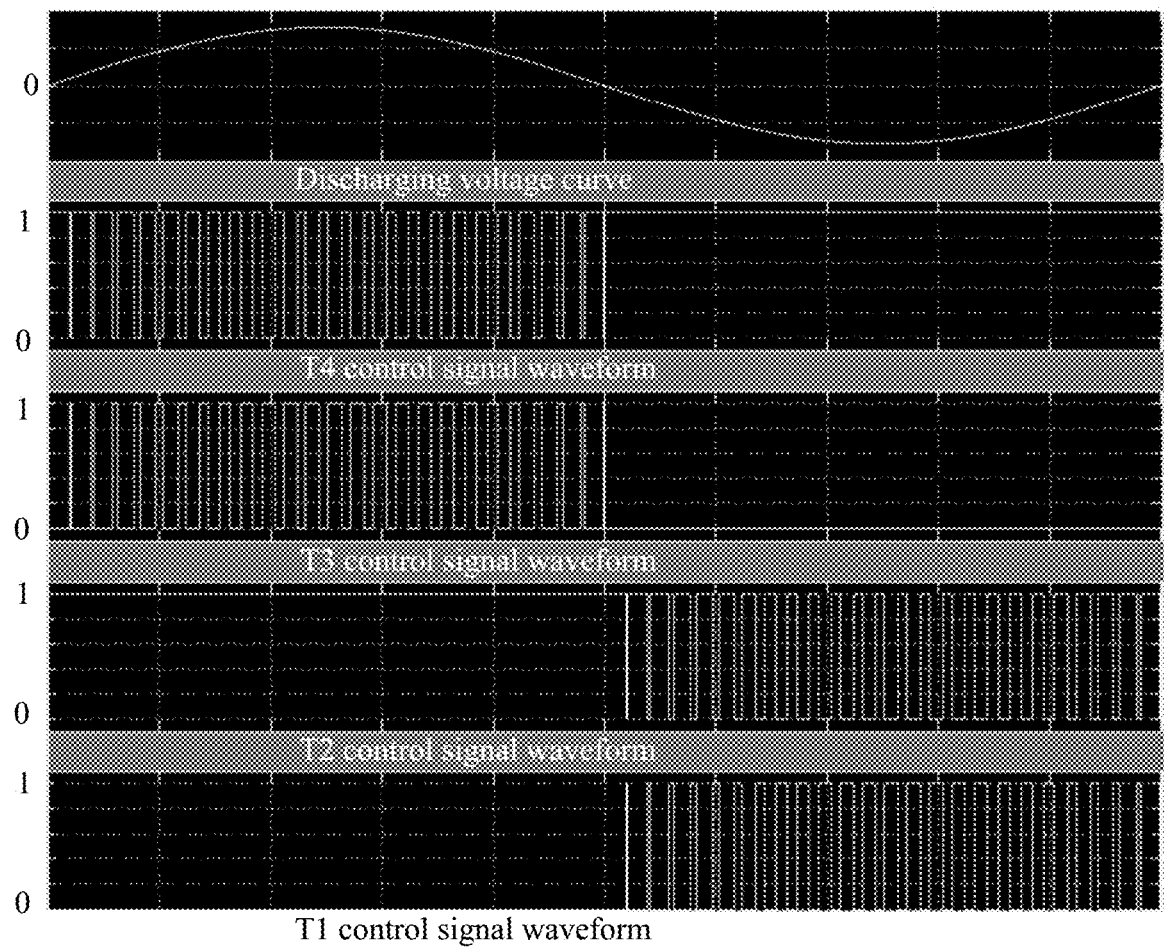
FIG. 6 is a schematic diagram of a control waveform of four switch tubes when an H bridge is controlled by adopting a second manner to enable a power battery to outwards discharge according to an embodiment of the present disclosure.

According to an embodiment of the present disclosure, as shown in FIG. 6, if the H bridge is controlled in the second manner B, and when an outward discharging transient voltage value of the vehicle-mounted charger is larger than 0, the second switch tube T2 is controlled to be ON, the first switch tube T1 is controlled to be OFF, and the third switch tube T3 and the fourth switch tube T4 are controlled to be ON and OFF complementarily and alternately. When the third switch tube T3 and the fourth switch tube T4 are controlled to be ON and OFF alternately and complementarily, the PWM waveform of the third switch tube T3 and the PWM waveform of the fourth switch tube T4 are controlled to be complementary with each other, and a duty ratio of the PWM waveform of the third switch tube T3 is controlled from small to large and then to small, and a duty ratio of the PWM waveform of the fourth switch tube T4 is controlled from large to small and then to large; when the outward discharging transient voltage value of the vehicle-mounted charger is smaller than 0, the fourth switch tube T4 is controlled to be ON, the third switch tube T3 is controlled to be OFF, and the first switch tube T1 and the second switch tube T2 are controlled to be ON and OFF complementarily and alternately. When the first switch tube T1 and the second switch tube T2 are controlled to be ON and OFF alternately and complementarily, the PWM waveform of the first switch tube T1 and the PWM waveform of the second switch tube T2 are controlled to be complementary with each other, and a duty ratio of the PWM waveform of the first switch tube T1 is controlled from small to large and then to small, and a duty ratio of the PWM waveform of the second switch tube T2 is controlled from large to small and then to large.

At step S2, a relation between the first total discharging period (TC) and the second total discharging period (TD) is determined.

At step S3, a manner for controlling the H bridge is selected according to the relation between the first total discharging period TC and the second total discharging period TD to perform temperature balanced control over the first switch tube, the second switch tube, the third switch tube and the fourth switch tube.

In an embodiment, step S3 includes: selecting the manner from the first manner and the second manner for controlling the H bridge according to the relation between the first total discharging period TC and the second total discharging period TD; and controlling the H bridge in the selected manner to perform the temperature balanced control over the first switch tube, the second switch tube, the third switch tube and the fourth switch tube.

In the discharging process of the power battery via the vehicle-mounted charger, if the H bridge is only controlled by adopting the first manner A, when the outward discharging transient voltage value of the vehicle-mounted charger is larger than 0, the first switch tube T1 is kept ON always, the second switch tube T2 is kept OFF always, and the third switch tube T3 and fourth switch tube T4 are ON and OFF alternately and complementarily, and the inductor in the vehicle-mounted charger is charged when the third switch tube T3 is OFF and the fourth switch tube T4 is ON, and discharges when the third switch tube T3 is ON and the fourth switch tube T4 is OFF; when the outward discharging transient voltage value of the vehicle-mounted charger is smaller than 0, the third switch tube T3 is kept ON always, the fourth switch tube T4 is kept OFF always, and the first switch tube T1 and second switch tube T2 are ON and OFF alternately and complementarily, and the inductor in the vehicle-mounted charger is charged when the first switch tube T1 is OFF and the second switch tube T2 is ON, and discharges when the first switch tube T1 is ON and the second switch tube T2 is OFF. Since the inductor is charged when the second switch tube T2 and the fourth switch tube T4 are ON, the second switch tube T2 and the fourth switch tube T4 are OFF with current, and hard switching is performed, therefore, the second switch tube T2 and the fourth switch tube T4 are overheated.

Similarly, in the discharging process of the power battery via the vehicle-mounted charger, if the H bridge is only controlled by adopting the second manner B, when the outward discharging transient voltage value of the vehicle-mounted charger is larger than 0, the first switch tube T1 is kept OFF always, the second switch tube T2 is kept ON always, and the third switch tube T3 and fourth switch tube T4 are ON and OFF alternately and complementarily, and the inductor in the vehicle-mounted charger is charged when the fourth switch tube T4 is OFF and the third switch tube T3 is ON, and discharges when the fourth switch tube T4 is ON and the third switch tube T3 is OFF; when the outward discharging transient voltage value is smaller than 0, the fourth switch tube T4 is kept ON always, the third switch tube T3 is kept OFF always, and the first switch tube T1 and second switch tube T2 are ON and OFF alternately and complementarily, and the inductor in the vehicle-mounted charger is charged when the second switch tube T2 is OFF and the first switch tube T1 is ON, and discharges when the second switch tube T2 is ON and the first switch tube T1 is OFF. Since the inductor is charged when the first tube T1 and the third tube T3 are ON, the first switch tube T1 and the third switch tube T3 are OFF with current, and hard switching is performed, therefore, the first switch tube T1 and the third switch tube T3 are overheated.

Therefore, in an embodiment of the present disclosure, the H bridge is controlled by adopting the first manner A, such that when the power battery discharges via the vehicle-mounted charger, the period that the H bridge is controlled in the first manner A is recorded, thus the first total discharging period TC of controlling the H bridge in the first manner A is obtained, and then is stored; the H bridge is controlled by adopting the second manner B, such that when the power battery discharges via the vehicle-mounted charger, the period that the H bridge is controlled in the second manner B is recorded, thus the second total discharging period TD of controlling the H bridge in the second manner B is obtained, and then is stored. Then, in the discharging process of the power battery via the vehicle-mounted charger, the relation of the first total discharging period TC and the second total discharging period TD is determined. Finally, the manner of controlling the H bridge is selected according to the relation of the first total discharging period TC and the second total discharging period TD, thereby realizing the temperature balanced control over the first switch tube, the second switch tube, the third switch tube and the fourth switch tube.

According to an embodiment of the present disclosure, selecting the manner of controlling the H bridge according to the relation between the first total discharging period TC and the second total discharging period TD includes: if the first total discharging period TC is larger than the second total discharging period TD, the second manner B for controlling the H bridge is selected when the power battery discharges via the vehicle-mounted charger; if the second total discharging period TD is larger than the first total discharging period TC, the first manner A for controlling the H bridge is selected when the power battery discharges via the vehicle-mounted charger; and if the first total discharging period TC is equal to the second total discharging period TD, the first manner A or the second manner B for controlling the H bridge is selected when the power battery discharges via the vehicle-mounted charger.

That is to say, before the power battery discharges via the vehicle-mounted charger, the first total discharging period TC that the H bridge is controlled in the first manner A as well as the second total discharging period TD that the H bridge is controlled in the second manner B are obtained from a storage region and then the relation of the first total discharging period TC and the second total discharging period TD is determined, the first manner A for controlling the H bridge firstly or the second manner B for controlling the H bridge firstly is determined according the relation of the first total discharging period TC and the second total discharging period TD. In other words, the first total discharging period TC and the second total discharging period TD are obtained from the storage region, an aim to determine the relation of the first total discharging period TC and the second total discharging period TD is to determine the selected manner for controlling the H bridge firstly when the power battery discharges via the vehicle-mounted charger. Where, after the manner is selected during each discharging cycle, the H bridge is controlled to according to a fixed manner, i.e., the first or second manner, the total discharging period is recorded when the manner is switched, for example, when the H bridge is firstly controlled by adopting the first manner, the first total discharging period is recorded in this manner switching, the first total discharging period is equal to the first total discharging period obtained from the storage region plus the discharging period recorded in the discharging cycle of this time, that is, the first total charging period TC is updated every time when the discharging cycle ends, such that it is convenient to select the manner from the first manner or the second manner for controlling the H bridge.

Figure 7:
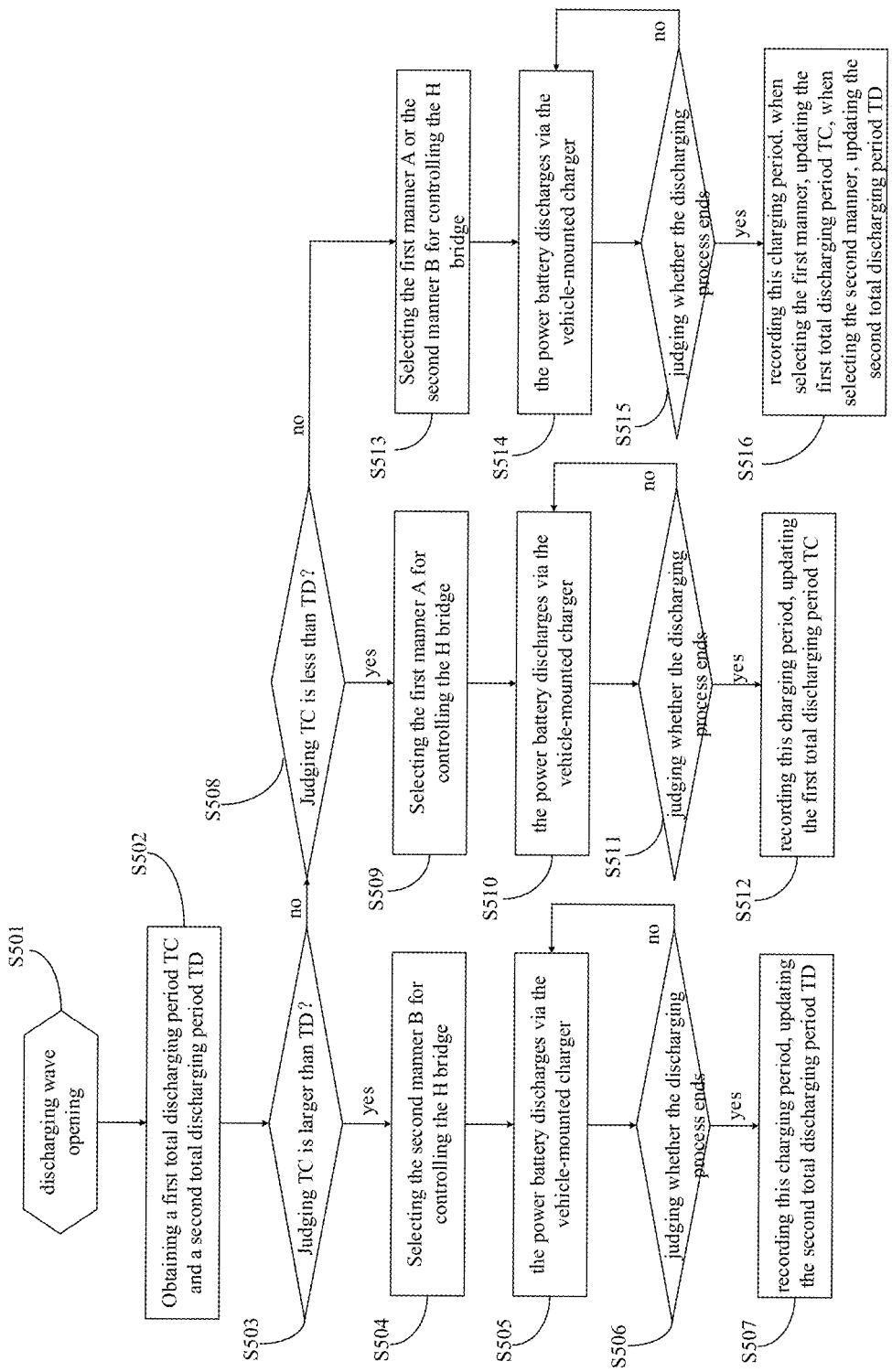
FIG. 7 is a control flow chart when a power battery discharges via the vehicle-mounted charger according to a specific embodiment of the present disclosure.

According to one embodiment of the present disclosure, as shown in FIG. 7, the method for controlling a vehicle-mounted charger of an electric vehicle includes the followings.

At step S501, a discharging wave is opened, i.e., when the power battery discharges via the vehicle-mounted charger, a control waveform needs to be output to control the switch tubes in the H bridge.

At step S502, a first total discharging period TC in a first manner A and a second total discharging period TD in a second manner B are obtained.

At step S503, it is judged whether the first total discharging period TC is larger than the second total discharging period TD, step S504 is executed if yes, and step S508 is executed if not.

At step S504, the second manner B is selected to control the H bridge, then step S505 is executed.

At step S505, the power battery discharges via the vehicle-mounted charger, then step S506 is executed.

At step S506, it is judged whether the discharging process ends, step S507 is executed if yes and step S505 is executed if not.

At step S507, this discharging period is recorded, such that the updated second total discharging period TD equals to the second total discharging period TD obtained from the storage region summing this discharging period.

At step S508, it is judged whether the first total discharging period TC is less than the second discharging period TD, step S509 is executed if yes, and step S513 is executed if not.

At step S509, the second manner B is selected to control the H bridge, then step S505 is executed.

At step S510, the power battery discharges via the vehicle-mounted charger, then step S511 is executed.

At step S511, it is judged whether the discharging process ends, step S512 is executed if yes and step S510 is executed if not.

At step S512, this discharging period is recorded, such that the updated first total discharging period TC equals to the first total discharging period TC obtained from the storage region summing this discharging period.

At step S513, the first manner A or the second manner B is selected to control the H bridge, then step S514 is executed.

At step S514, the power battery discharges via the vehicle-mounted charger, then step S506 is executed.

At step S515, it is judged whether the discharging process ends, step S516 is executed if yes, and step S514 is executed if not.

At step S516, this discharging period is recorded. In which, if the first manner A is selected, such that the updated first total discharging period TC equals to the first total discharging period TC obtained from the storage region summing this discharging period; if the second manner B is selected, such that the updated second total discharging period TD equals to the second total discharging period TD obtained from the storage region summing this discharging period.

Therefore, according to the method for controlling a vehicle-mounted charger of an electric vehicle, by recording the first manner for controlling the H bridge or the second manner for controlling the H bridge when discharging every time, and then recording the first total discharging period TC adopting the first manner A and the second total discharging period TD adopting the second manner B, and then determining the relation of the first total discharging period TC and the second total discharging period TD, finally, selecting the manner for controlling the H bridge according to the relation of the first total discharging period TC and the second total discharging period TD, so as to perform the temperature balanced control over the first switch tube, the second switch tube, the third switch tube and the fourth switch tube, such that the heating of the first switch tube, the second switch tube, the third switch tube and the fourth switch tube is enabled to be relative balanced, and the service life of the vehicle-mounted charger is prolonged.

According to the method for controlling a vehicle-mounted charger of an electric vehicle in embodiments of the present disclosure, when the power battery discharges via the vehicle-mounted charger every time, the first total discharging period TC for controlling the H bridge in the first manner A and the second total discharging period TD for controlling the H bridge in the second manner B are obtained, and the manner from the first manner A and the second manner B for controlling the H bridge is selected according to the relation between the first total discharging period TC and the second total discharging period TD, finally, the H bridge is controlled in the first manner or the second manner, so as to perform the temperature balanced control over the first switch tube, the second switch tube, the third switch tube and the fourth switch tube, such that the heating of each switch tube is relatively balanced, the service life of the switch tubes in the H bridge is prolonged, and thus the service period is prolonged.

As shown in FIGS. 1 to 3, a vehicle-mounted charger according to embodiments of the present disclosure includes an H bridge and a controller such as an MCU (Micro Control Unit). The H bridge includes a first switch tube T1, a second switch tube T2, a third switch tube T3 and a fourth switch tube T4. The controller is configured to obtain a first total discharging period TC for controlling the H bridge in a first manner and a second total discharging period TD for controlling the H bridge in a second manner when the power battery discharges via the vehicle-mounted charger; to determine a relation between the first total discharging period TC and the second total discharging period TD; and to select a manner from the first manner and the second manner for controlling the H bridge according to the relation between the first total discharging period TC and the second total discharging period TD to perform temperature balanced control over the first switch tube, the second switch tube, the third switch tube and the fourth switch tube.

According to an embodiment of the present disclosure, the controller is further configured to: select the manner from the first manner and the second manner for controlling the H bridge according to the relation between the first total discharging period TC and the second total discharging period TD; and control the H bridge in the selected manner to perform the temperature balanced control over the first switch tube, the second switch tube, the third switch tube and the fourth switch tube.

According to an embodiment of the present disclosure, the controller is further configured to: select the second manner for controlling the H bridge when the first total discharging period TC is larger than the second total discharging period TD; select the first manner for controlling the H bridge when the first total discharging period TC is less than the second total discharging period TD; and select the first manner or the second manner for controlling the H bridge when the first total discharging period TC is equal to the second total discharging period TD.

That is to say, in an embodiment, the controller is configured to control the H bridge in the first manner A, such that when the power battery discharges via the vehicle-mounted charger, the period that the H bridge is controlled in the first manner A is recorded, thus the first total discharging period TC of controlling the H bridge in the first manner A is obtained, and then is stored; the controller is configured to control the H bridge in the second manner B, such that when the power battery discharges via the vehicle-mounted charger, the period that the H bridge is controlled in the second manner B is recorded, thus the second total discharging period TD of controlling the H bridge in the second manner B is obtained, and then is stored. Then, in the discharging process of the power battery, the controller determines the relation of the first total discharging period TC and the second total discharging period TD. Finally, the manner of controlling the H bridge is selected from the first manner A or the second manner B according to the relation of the first total discharging period TC and the second total discharging period TD, thereby realizing the temperature balanced control over the first switch tube, the second switch tube, the third switch tube and the fourth switch tube.

According to an embodiment of the present disclosure, if the controller is configured to control the H bridge in the first manner A to discharge from the power battery, and when an outward discharging transient voltage value of the vehicle-mounted charger is larger than 0, the first switch tube T1 is controlled to be ON, the second switch tube T2 is controlled to be OFF, and the third switch tube T3 and the fourth switch tube T4 are controlled to be ON and OFF complementarily and alternately. When the third switch tube T3 and the fourth switch tube T4 are controlled to be ON and OFF alternately and complementarily, the PWM waveform of the third switch tube T3 and the PWM waveform of the fourth switch tube T4 are controlled to be complementary with each other, and a duty ratio of the PWM waveform of the third switch tube T3 is controlled from large to small and then to large, and a duty ratio of the PWM waveform of the fourth switch tube T4 is controlled from small to large and then to small; when the outward discharging transient voltage value of the vehicle-mounted charger is smaller than 0, the third switch tube T3 is controlled to be ON, the fourth switch tube T4 is controlled to be OFF, and the first switch tube T1 and the second switch tube T2 are controlled to be ON and OFF complementarily and alternately. When the first switch tube T1 and the second switch tube T2 are controlled to be ON and OFF alternately and complementarily, the PWM waveform of the first switch tube T1 and the PWM waveform of the second switch tube T2 are controlled to be complementary with each other, and a duty ratio of the PWM waveform of the first switch tube T1 is controlled from large to small and then to large, and a duty ratio of the PWM waveform of the second switch tube T2 is controlled from small to large and then to small.

According to an embodiment of the present disclosure, if the controller is configured to control the H bridge in the second manner B, and when an outward discharging transient voltage value of the vehicle-mounted charger is larger than 0, the second switch tube T2 is controlled to be ON, the first switch tube T1 is controlled to be OFF, and the third switch tube T3 and the fourth switch tube T4 are controlled to be ON and OFF complementarily and alternately. When the third switch tube T3 and the fourth switch tube T4 are controlled to be ON and OFF alternately and complementarily, the PWM waveform of the third switch tube T3 and the PWM waveform of the fourth switch tube T4 are controlled to be complementary with each other, and a duty ratio of the PWM waveform of the third switch tube T3 is controlled from small to large and then to small, and a duty ratio of the PWM waveform of the fourth switch tube T4 is controlled from large to small and then to large; when the outward discharging transient voltage value of the vehicle-mounted charger is smaller than 0, the fourth switch tube T4 is controlled to be ON, the third switch tube T3 is controlled to be OFF, and the first switch tube T1 and the second switch tube T2 are controlled to be ON and OFF complementarily and alternately. When the first switch tube T1 and the second switch tube T2 are controlled to be ON and OFF alternately and complementarily, the PWM waveform of the first switch tube T1 and the PWM waveform of the second switch tube T2 are controlled to be complementary with each other, and a duty ratio of the PWM waveform of the first switch tube T1 is controlled from small to large and then to small, and a duty ratio of the PWM waveform of the second switch tube T2 is controlled from large to small and then to large.

In an embodiment of the present disclosure, as shown in FIG. 1 or FIG. 2 or FIG. 3, the first switch tube T1, the second switch tube T2, the third switch tube T3 and the fourth switch tube T4 are all IGBTs (Insulated Gate Bipolar Transistors), certainly, in other embodiments of the present disclosure, the first switch tube T1, the second switch tube T2, the third switch tube T3 and the fourth switch tube T4 can also be MOSs (Metal Oxide Semiconductors).

According to the vehicle-mounted charger of an electric vehicle in embodiments of the present disclosure, when the power battery discharges every time, the controller is configured to obtain the first total discharging period for controlling the H bridge in the first manner and the second total discharging period for controlling the H bridge in the second manner, and to select the manner from the first manner and the second manner for controlling the H bridge according to the relation between the first total discharging period and the second total discharging period, finally, to control the H bridge in the selected manner to perform the temperature balanced control over the first switch tube, the second switch tube, the third switch tube and the fourth switch tube, such that the heating of each switch tube is relatively balanced, the service life of the switch tubes in the H bridge is prolonged, and thus the service period is prolonged.

In addition, embodiments of the present disclosure also provide an electric vehicle, including the above vehicle-mounted charger of an electric vehicle.

According to the electric vehicle of embodiments of the present disclosure, the power battery discharges via the vehicle-mounted charger, so as to perform temperature balanced control over the first switch tube, the second switch tube, the third switch tube and the fourth switch tube, such that the heating of each switch tube is relatively balanced, the service life of the switch tubes in the H bridge is prolonged, therefore, the service life of the vehicle-mounted charger is prolonged.

In the description of the present disclosure, it is understandable that the directions of position relations indicated by the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial" and "peripheral" are based on the directions or position relations as shown in the drawings, are merely convenient for describing the present disclosure and simplifying the description rather than indicating or implying the fact that devices or elements must have specific directions, or configured or operated in specific directions, and thus cannot understood as a limitation to the present disclosure.

In addition, the terms "first" and "second" merely aim to describe rather than being understood as indication or implication of relative importance or impliedly indicating a number of the indicated technical features. Therefore, the characteristics defined by "first" and "second" can clearly or impliedly comprise at least one such characteristic. In the description of the present disclosure, "more" means at least two, for example, two, three, etc., unless otherwise clearly specifically defined.

In the present disclosure, unless otherwise clearly specified and defined, the terms "mounted", "jointed", "connected", "fixed", etc., should be generalized understood, for example, the "connected" can be fixedly connected, or detachably connected, or integrated, can be mechanically connected or electrically connected, can also be directly connected or connected by an intermediate medium, and can also be internally communicated of two elements, or interacted of two elements, unless otherwise clearly defined. Those ordinary skilled in the art can understand the specific meaning of the terms in the present disclosure according to specific conditions.

In the present disclosure, unless otherwise clearly specified and defined, the case that a first characteristic is "on" or "under" a second characteristic can be the case that the first characteristic and the second characteristic are in direct contact, or in indirect contact by an intermediate medium. Besides, the case that the first characteristic is "on", "above" and "over" the second characteristic can be the case that the first characteristic is right or obliquely above the second characteristic, or only represents that the horizontal height of the first characteristic is higher than that of the second characteristic. The case that the first characteristic is "under", "below" and "beneath" the second characteristic can be the case that the first characteristic is right or obliquely below the second characteristic, or only represents that the horizontal height of the first characteristic is lower than that of the second characteristic.

In the description of the specification, the description of the reference terms "one embodiment", "some embodiments", "examples", "specific examples" or "some examples" refers to the fact that the specific characteristic, structure, material or feature described in combination with the embodiment or example is contained in the at least one embodiment or example of the present disclosure. In the present specification, and the schematic expression of the above terms unnecessarily aims at the same embodiment or example. In addition, the described specific characteristic, structure, material or feature can be combined in a proper manner in any one or more embodiments or examples. Besides, in the case without mutual contradiction, those skilled in the art can integrate or combine different embodiments or examples or the characteristics of different embodiments or examples described in the present specification.

Although the embodiments of the present disclosure have been shown and described as above, it is understandable that those ordinary skilled in the art can change, modify, substitute and transform the above embodiments in a scope of the present disclosure.

What is claimed is:

1. A method for controlling a vehicle-mounted charger of an electric vehicle, wherein the vehicle-mounted charger comprises an H bridge, and the H bridge comprises a first switch transistor, a second switch transistor, a third switch transistor and a fourth switch transistor, the method comprising:

obtaining a first total discharging period (TC) for controlling the H bridge in a first manner and a second total discharging period (TD) for controlling the H bridge in a second manner when a power battery discharges via the vehicle-mounted charger;

determining a relation between the first total discharging period (TC) and the second total discharging period (TD); and selecting a manner for controlling the H bridge according to the relation between the first total discharging period (TC) and the second total discharging period (TD) to perform temperature balanced control over the first switch transistor, the second switch transistor, the third switch transistor, and the fourth switch transistor.

2. The method according to claim 1, wherein selecting a manner for controlling the H bridge according to the relation between the first total discharging period (TC) and the second total discharging period (TD) to perform temperature balanced control over the first switch transistor, the second switch transistor, the third switch transistor and the fourth switch transistor comprises:

selecting the manner from the first manner and the second manner for controlling the H bridge according to the relation between the first total discharging period (TC) and the second total discharging period (TD); and controlling the H bridge in the selected manner to perform the temperature balanced control over the first switch transistor, the second switch transistor, the third switch transistor and the fourth switch transistor.

3. The method according to claim 2, wherein selecting the manner from the first manner and the second manner for controlling the H bridge according to the relation between the first total discharging period (TC) and the second total discharging period (TD) comprises:

selecting the second manner for controlling the H bridge when the first total discharging period (TC) is larger than the second total discharging period (TD);

selecting the first manner for controlling the H bridge when the first total discharging period (TC) is less than the second total discharging period (TD); and selecting the first manner or the second manner for controlling the H bridge when the first total discharging period (TC) is equal to the second total discharging period (TD).

4. The method according to claim 3, wherein controlling the H bridge in the first manner comprises:
when an outward discharging transient voltage value of the vehicle-mounted charger is larger than 0, controlling the first switch transistor to be ON, controlling the second switch transistor to be OFF, and controlling the third switch transistor and the fourth switch transistor to be ON and OFF alternately and complementarily; and
when the outward discharging transient voltage value of the vehicle-mounted charger is smaller than 0, controlling the third switch transistor to be ON, controlling the fourth switch transistor is controlled to be OFF, and controlling the first switch transistor and the second switch transistor to be ON and OFF alternately and complementarily.

5. The method according to claim 3, wherein controlling the H bridge in the second manner comprises:
when an outward discharging transient voltage value of the vehicle-mounted charger is larger than 0, controlling the second switch transistor to be ON, controlling the first switch transistor to be OFF, and controlling the third switch transistor and the fourth switch transistor to be ON and OFF alternately and complementarily; and
when the outward discharging transient voltage value of the vehicle-mounted charger is smaller than 0, controlling the fourth switch transistor to be ON, controlling the third switch transistor to be OFF, and controlling the first switch transistor and the second switch transistor to be ON and OFF alternately and complementarily.

6. A vehicle-mounted charger of an electric vehicle, comprising:
an H bridge comprising a first switch transistor, a second switch transistor, a third switch transistor and a fourth switch transistor; and
a controller configured to obtain a first total discharging period (TC) for controlling the H bridge in a first manner, and a second total discharging period (TD) for controlling the H bridge in a second manner when a power battery discharges via the vehicle-mounted charger; to determine a relation between the first total discharging period (TC) and the second total discharging period (TD); and to select a manner for controlling the H bridge according to the relation between the first total discharging period (TC) and the second total discharging period (TD) to perform temperature balanced control over the first switch transistor, the second switch transistor, the third switch transistor and the fourth switch transistor.

7. The vehicle-mounted charger according to claim 6, wherein the controller is further configured to:
select the manner from the first manner and the second manner for controlling the H bridge according to the relation between the first total discharging period (TC) and the second total discharging period (TD); and
control the H bridge in the selected manner to perform the temperature balanced control over the first switch transistor, the second switch transistor, the third switch transistor and the fourth switch transistor.

8. The vehicle-mounted charger according to claim 7, wherein the controller is further configured to:
select the second manner for controlling the H bridge when the first total discharging period (TC) is larger than the second total discharging period (TD);
select the first manner for controlling the H bridge when the first total discharging period (TC) is less than the second total discharging period (TD); and
select the first manner or the second manner for controlling the H bridge when the first total discharging period (TC) is equal to the second total discharging period (TD).

9. The vehicle-mounted charger according to claim 8, wherein the controller is further configured to:
control the first switch transistor to be ON, the second switch transistor to be OFF and the third switch transistor and the fourth switch transistor to be ON and OFF alternately and complementarily when an outward discharging transient voltage value of the vehicle-mounted charger is larger than 0; and
control the third switch transistor to be ON, the fourth switch transistor to be OFF, and the first switch transistor and the second switch transistor to be ON and OFF alternately and complementarily when the outward discharging transient voltage value of the vehicle-mounted charger is smaller than 0.

10. The vehicle-mounted charger according to claim 8, wherein the controller is further configured to:
control the second switch transistor to be ON, the first switch transistor to be OFF, and the third switch transistor and the fourth switch transistor to be ON and OFF alternately and complementarily when an outward discharging transient voltage value of the vehicle-mounted charger is larger than 0;
control the fourth switch transistor to be ON, the third switch transistor to be OFF, and the first switch transistor and the second switch transistor to be ON and OFF alternately and complementarily when the outward discharging transient voltage value of the vehicle-mounted charger is smaller than 0.

11. The vehicle-mounted charger according to claim 10, wherein the first switch transistor, the second switch transistor, the third switch transistor and the fourth switch transistor are IGBTs or MOS transistors respectively.

12. An electric vehicle, comprising:
a vehicle-mounted charger for the electric vehicle, the vehicle-mounted charger comprising:
an H bridge comprising a first switch transistor, a second switch transistor, a third switch transistor and a fourth switch transistor; and
a controller configured to obtain a first total discharging period (TC) for controlling the H bridge in a first manner, and a second total discharging period (TD) for controlling the H bridge in a second manner when a power battery discharges via the vehicle-mounted charger; to determine a relation between the first total discharging period (TC) and the second total discharging period (TD); and to select a manner for controlling the H bridge according to the relation between the first total discharging period (TC) and the second total discharging period (TD) to perform temperature balanced control over the first switch transistor, the second switch transistor, the third switch transistor and the fourth switch transistor.

13. The electric vehicle according to claim 12, wherein the controller is further configured to:
select the manner from the first manner and the second manner for controlling the H bridge according to the relation between the first total discharging period (TC) and the second total discharging period (TD); and
control the H bridge in the selected manner to perform the temperature balanced control over the first switch transistor, the second switch transistor, the third switch transistor and the fourth switch transistor.

14. The electric vehicle according to claim 12, wherein the controller is further configured to:
select the second manner for controlling the H bridge when the first total discharging period (TC) is larger than the second total discharging period (TD);
select the first manner for controlling the H bridge when the first total discharging period (TC) is less than the second total discharging period (TD); and
select the first manner or the second manner for controlling the H bridge when the first total discharging period (TC) is equal to the second total discharging period (TD).

* * * * *